United States Patent [19]
Rosenberg

[11] 3,803,810
[45] Apr. 16, 1974

[54] LIQUID-GAS SEPARATOR AND FILTER
[75] Inventor: David J. Rosenberg, Glen Cove, N.Y.
[73] Assignee: Pall Corporation, Glen Cove, N.Y.
[22] Filed: June 14, 1972
[21] Appl. No.: 262,824

Related U.S. Application Data
[63] Continuation-in-part of Ser. No. 248,911, May 1, 1972, abandoned.

[52] U.S. Cl.................... 55/159, 55/321, 55/482
[51] Int. Cl............................................ B01d 19/00
[58] Field of Search.............. 55/159, 171, 321–324, 55/482–485; 128/214, 214.2; 210/DIG. 23

[56] References Cited
UNITED STATES PATENTS
3,523,408  8/1970  Rosenberg............................ 55/159
FOREIGN PATENTS OR APPLICATIONS
1,221,625  2/1971  Great Britain Primary Examiner—Charles N. Hart

[57] ABSTRACT

A filter unit that will not gas block is provided, capable of separating gases and liquids and of filtering liquids, and especially of removing and venting gases contained in liquids to be filtered, particularly liquids that must be filtered through a fine filter, such as in the filtration of bacteria. The device is based on a combination of three filters, arranged side-by-side, in alternate sequence. At least one filter is wetted by the liquid, and at least one is liquid-repellent; the liquid-wetted filter passes only the liquid, and the liquid-repellent filter passes only the gas. By employing three filters side-by-side, in alternate sequence, with two like filters on each side of the unlike filter of the three, the device is made position-insensitive with respect to gas removal.

15 Claims, 6 Drawing Figures

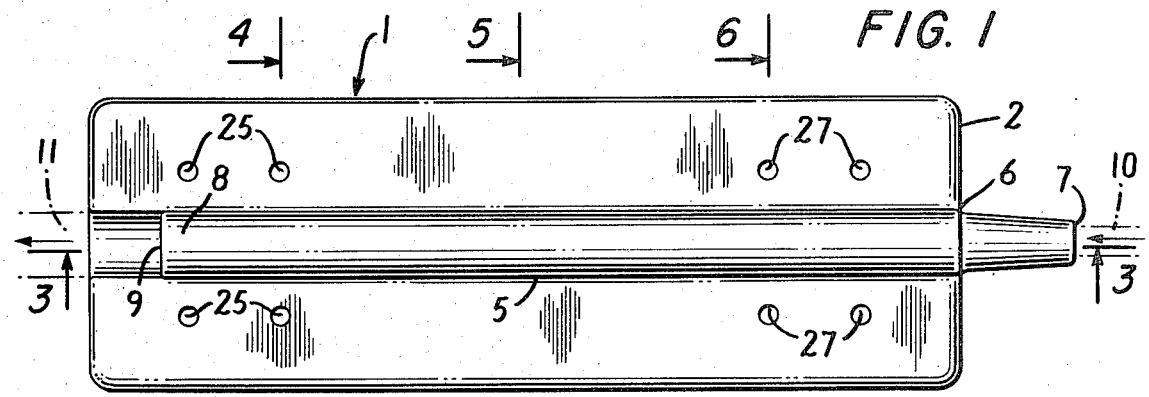
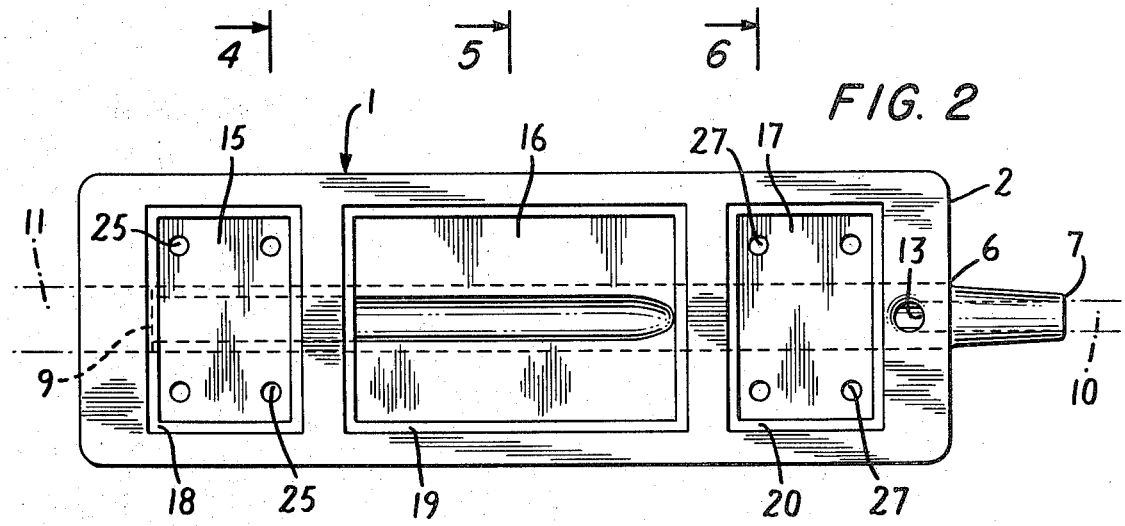
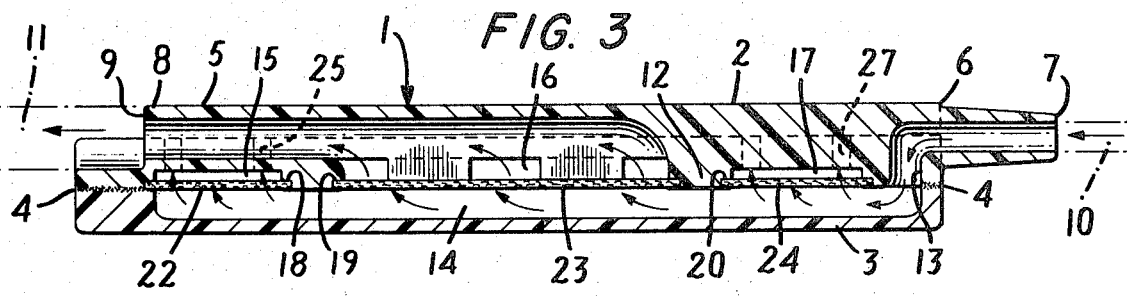
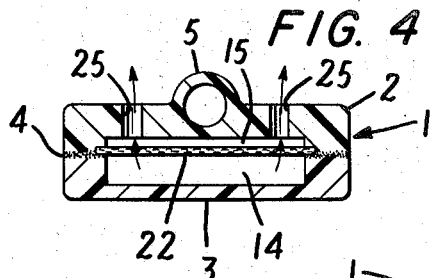
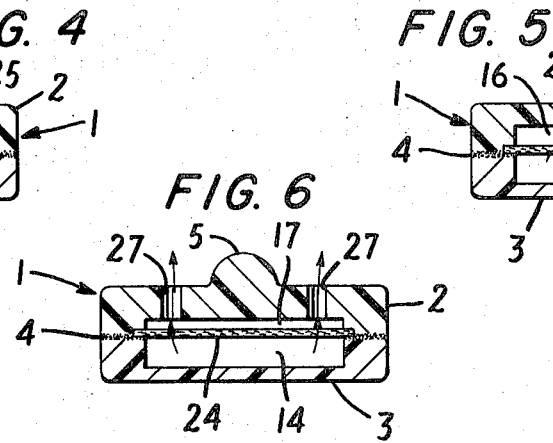

LIQUID-GAS SEPARATOR AND FILTER

This application is a continuation-in-part of Ser. No. 248,911 filed May 1, 1972 and now abandoned.

The entrainment of gases in liquids and of liquids in gases are common phenomena in many chemical processes, involving gases and liquids as reactants and/ or as reaction products. Such mixtures frequently must be separated by some mechanical device, especially when emulsification occurs, because of the slowness of gravity separation of the mixture. Centrifugal and vortex separators can be used for this purpose, and other types of mechanical devices are available. These, however, are bulky, and not always practical to use.

Frequently, it is necessary to separate the gas from the liquid with absolute assurance that no entrained gas will remain with the liquid. When liquids are injected into a patient, for example, in various types of medical treatment, air cannot be injected concurrently without the danger of an embolism, with possibly fatal consequences. Moreover, a fine filter when wetted with liquid will not pass a gas and if its surface is covered with gas, a gas blockage preventing liquid flow through the filter can result. This is especially a problem with fine filters capable of removing microorganisms.

In many medicinal injections, it is generally customary to clear the line of air before injecting the liquid, but the problem of air entering the line thereafter and being injected with the liquid cannot be entirely foreclosed, particularly when the liquid is injected under pressure, as by a mechanical pump. A further problem is the possibility of injection of air into the patient after the supply of liquid has been exhausted. In all of these cases, it is necessary that a device be used that will prevent such air from reaching the patient, and for this purpose cumbersome mechanical devices such as centrifuges and vortex separators are not practical.

It is known that porous materials of small pore size when wetted by a liquid are incapable of passing gases at fluid pressures below the so-called "bubble point" of the material. The bubble point is defined as the characteristic pressure at which the first bubble of air appears, when such a material is pressurized with air while immersed just under the surface of a liquid. The bubble point effect is well known from U.S. Pat. No. 3,007,334, dated Nov. 7, 1961. In fact, the method and apparatus according to that patent make it possible to determine the maximum pore size of filter elements from the pressures at the bubble point, since these pressures are directly correlated with the pore size of the filter.

It has been proposed that this phenomenon be employed to prevent the passage of air to patients, by insertion in the fluid line leading to the patient of a microporous filter material which is preferentially wetted by the liquid being adminstered. Such a device when saturated with liquid will not permit the passage of air to the patient, so long as the fluid pressure is below the bubble point of the filter. However, the problem with such devices is that although they block the passage of air, they do not vent it, with the result that the air held back by the filter can cover the surface of the filter, restricting flow, and eventually may even block it, if the surface is completely covered, and increasing the pressure drop across the filter, with the result that the bubble point of the filter element can be reached sooner than expected, after which the blocked air will pass through, virtually all at once. Furthermore, the presence of this type of filter in the line makes it difficult if not impossible to clear the line of air once the filter has been wetted, which means that after the line has been used, it must be thoroughly dried out so as to dry the filter, before it can be cleared of air for the next use. This drying procedure is not always feasible, however, particularly where filters must be steamed, sterilized, or hot-water sanitized before use, and are therefore wetted completely before use.

Similar problems arise in chemical processes, where a liquid during transfer from one batch tank to another must be filtered. Air can be drawn into the filter housing at the end of each batch transfer, and this air must be vented before the next transfer. However, this can hardly be done through a liquid-wet or saturated filter having a high bubble point.

The problem is particularly troublesome with microporous filter materials having pores of less than one micron in diameter. Such filters are intended to filter out harmful micro-organisms from fluids, but in such filters the pressure differential needed to force air through a filter wetted with a liquid can be as high as 30 psid, as a result of which complete filter blockage can result from the presence of air in sufficient quantity in the system to cover the surface of the filter.

It is possible to avoid these difficulties to a certain extent by the use of filter materials that contain both hydrophobic and hydrophilic portions. The hydrophilic portions will pass the water, and the hydrophobic portions will not be wetted by water, and will therefore remain open for passage of gas therethrough. Such filters will pass air and other gases, but of course they cannot be used in medical applications or other applications to separate air or gas from the liquid.

It has been proposed that such air be collected in a storage space over the filter, through which the fluid flows down, but such a device is position-sensitive and limited in air storage capacity.

Rosenberg U.S. Pat. No. 3,523,408, issued Aug. 11, 1970, provides a liquid-gas separator that is capable of separating gases and liquids and of venting the gas. The gas separator comprises a housing; a chamber in the housing, of which chamber one wall comprises a filter material that is wetted by a liquid to be passed through the housing, and another wall comprises a filter material that is not wetted by the liquid passing through the housing, but, in fact, is liquid-repellent, and is opposite the first wall; an inlet in the housing for delivering fluid comprising gas and liquid to the chamber between the opposite liquid-wetted and liquid-repellent filter materials; a liquid outlet in the housing on the opposite side of the liquid-wetted material; and a gas outlet in the housing on the opposite side of the liquid-repellent material. Both the liquid-wetted and the liquid-repellent materials preferably have a pore size less than about 0.3 micron, at which harmful microorganisms cannot pass through. The housing and associated parts of the separator are preferably made of plastic, and are bonded or fused together in a one-piece construction. A device similar to that described by Rosenberg, having one of the filter materials crossing the chamber diagonally or at an angle to the filter material comprising another wall of the chamber, as described by Rosenberg at column 6, lines 34, to 38, is disclosed by Baxter Laboratories in British Pat. No. 1,221,625, published Feb. 3, 1971, corresponding to U.S. Ser. No. 787,141, filed Dec. 26, 1968, by Shaye and Bellamy.

Li et al. U.S. Pat. No. 3,394,533, patented July 30, 1968, describes a liquid-gas separator in which the liquid and gas components of a fluid are separated by a cone-shaped nonwetted screen disposed in the path of fluid flow. The Li et al. device is primarily intended to separate liquid droplets entrained in a stream of gas, whereas the Rosenberg and Baxter patents are primarily designed to separate a stream of gas bubbles entrained in a flow of liquid, but each will do both types of liquid-gas separation. The conically-shaped hydrophobic screen element admits the gas but prevents the liquid droplets from passing through, the liquid droplets are collected for removal from the chamber through at least one opening in the chamber near the exit, through the use of a hydrophilic screen and sump arrangement capable of passing the collected liquid without passing air. As the liquid droplets encounter the surface of the hydrophobic screen, they make physical contact with one another, and coalesce into larger droplets, which are more easily removed from the chamber.

Walker U.S. Pat. No. 3,364,658, dated Jan. 23, 1968, describes a three-phase separation device, especially suited for removing oil and water from the compressed air supplied to the air brakes of an over-the-road motor truck or tractor trailer. The compressed air is passed to the brakes through the separation device. The oil is passed into a compartment through a non-brittle material which is impervious to water and air. The water is passed into the same compartment through a nonbrittle material which is impervious to oil and air. A further separation barrier impervious to water and oil separate the air. The air-separating device is at the upper part of the chamber and the oil and water separation device is at the bottom of the chamber.

Bush et al, U.S. Pat. No. 3,149,758, issued Sept. 22, 1964, describes a combination filter and flow-divider for gas and liquid. The intention is to permit a liquid to escape from a container while air simultaneously is allowed to enter, to replace the liquid that is removed and facilitate removal of the liquid contents. The filters are capable of filtering out bacteria so as to prevent the ingress of microorganisms through one of the passages. The cap is provided with a liquid outlet passage in parallel fluid-flow relation with an air inlet passage, the liquid outlet passage being protected by a hydrophilic screen and the gas or air inlet passage being protected by a hydrophobic screen, both of which are microporous, in such a manner that the hydrophilic portion of the filter passes liquid into the outlet passage and the hydrophobic portion passes air into the container to replace the discharged liquid. The hydrophilic portion passes no substantial flow of air but filters any liquid returning from the outlet conduit back into the container, when the dispenser is released by the user. The hydrophobic portion is not wetted by the liquid, and therefore maintains its effectiveness to pass air and to filter microorganisms therefrom.

In accordance with the instant invention, a liquid-gas separator and filter is provided that is captable of separating gases and liquids and filter liquids and of venting the gases in any position of the filter. In this way, blockage of the system by the buildup of a gas block is avoided, while, at the same time, the entrained gas is entirely eliminated from the liquid, while the liquid is filtered through filter. Thus, the device of the invention is particularly adapted for medicinal applications where liquids must be filtered but air must be vented from the line, and must also be absolutely prevented from reaching a patient receiving an injection of the fluid. It is also applicable in chemical processes and like processes where mixtures of gases in liquids and/ or of liquids in gases must be fully separated from each other. In a preferred embodiment, the device also is capable of removing harmful microorganisms, so that the liquids and/ or gases passing through the device are sterilized at the same time, by the use of microporous filter materials, which also prevent entry of microorganisms through any gas vents which are open to the atmosphere.

The liquid-gas separator and filter in accordance with the invention comprises, in combination, a housing composed of at least two housing portions attached together, one housing portion having interior walls defining first, second and third chambers arranged side-by-side, two housing portions defining between them a gas-liquid fluid chamber in separate fluid-flow connection with each of the first, second and third chambers; first, second and third filter sheets across the line of fluid flow between the fluid chamber and the first, second and third chambers, of which filter sheets at least one is of filter material that is wetted by a liquid to be passed through the housing, and at least one is of filter material that is not wetted by such liquid, i.e. is liquid-repellent, and the other is of either filter material, the liquid-wetted and liquid-repellent filter sheets being arranged in alternating sequence, and such that all flow between the fluid chamber and the three chambers must pass through a filter; the fliquid-wetted filter passing only gas when wetted with liquid, and the liquid-repellent filter passing only gas; an inlet in the housing for delivering fluid comprising gas and liquid to the fluid chamber; a filtered liquid outlet in the housing on the opposite side of the liquid-wetted filter; a gas outlet in the housing on the opposite side of the liquid-repellent filter; the chamber on the opposite side of each liquid-wetted filter communicating with the liquid outlet, and the chamber on the opposite side of each liquid-repellent filter communicating with the gas outlet.

Both the liquid-wetted and the liquid-repellent materials preferably have a pore size of less than about 0.3 micron, at which harmful microrganisms cannot pass through. The housing portions and associated parts of the device are preferably made of plastic, and the housing portions are bonded or fused together in a one-piece construction.

The attached drawings show preferred embodiments of the invention.

FIG. 1 represents a top plan view of one type of liquid-gas separator and filter in accordance with the invention, in which there are two liquid-repellent filters, one on each side of a single liquid-wetted filter.

FIG. 2 is a plan view of the inside of one housing portion, in this case, the upper portion, of the device of FIG. 1, with the filters removed.

FIG. 3 is a longitudinal sectional view taken along the lines 3—3 of the device of FIG. 1.

FIG. 4 is a cross-sectional view taken along the lines 4—4 of the device of FIG. 1.

FIG. 5 is a cross-sectional view taken along the lines 5—5 of the device of FIG. 1.

FIG. 6 is a cross-sectional view taken along the lines 6—6 of the device of FIG. 1.

The liquid-gas separator and filter of the invention is quite versatile, and the construction design is such that it can be adapted to meet any gas-liquid separation and filtration requirements. The essential materials of which it is constructed are known, and available, and readily lend themselves to the construction of devices of any desired size. For medical applications, it is usually preferably that the fluid chambers have as small a total fluid volume as possible, less than 0.5 cc. The relative proportion of available surface area for the liquid-wetted and liquid-repellent filters can be adjusted as required, and will depend upon the relative volumes of fluid being processed, and of liquids and gases being passed therethrough.

Because of the desirability of preventing distortion, and for greater strength and resistance to rupture, in most applications the housing is preferably of a rigid construction, using rigid sheets or molded or cast plastic parts, or metal, thus making it possible for the device to resist internal fluid pressures up to the bubble point of the filters used. If high fluid pressures are not to be encountered, however, the housing can be of a flexible construction, in which case it can be made flexible sheet material, such as polyvinyl chloride, vinyl chloride-vinylidene chloride copolymers, polyesters, polyethylene or polypropylene sheet.

It is frequently helpful that the housing be transparent, so that the device without dismantling the functioning of the device and the condition of the liquid-repellent and liquid-wetted filter materials can be observed, inasmuch as these materials also serve as filters, and will remove suspended solid material, such as dirt and other contaminants. For normal use as in medical applications, the housing and internal dimensions are adequate to provide the dirt capacity needed in the system in which it is to be used. In medical applications, the dirt capacity need not be large, because the medicaments are normally clear and contaminant-free, and the liquid filter is needed to ensure that there are no particles that should not be there, such as microorganisms, or in instances where non-compatible medicaments are administered and precipitates result. The liquid filter prevents them from reaching the patient.

Thus, for example, the housing can be constructed of rigid plastic material that is also transparent, such as polyethylene, polymethyl methacrylate, polymethyl acrylate, polymethyl pentene-1, polyvinyl chloride, and vinyl chloride-vinylidene chloride copolymers. Translucent materials, such as polypropylene, polyethylene, urea-formaldehyde, and melamine-formaldehyde polymers, can also be employed. Other plastic materials that are particularly suitable are polystyrene, polyamides, polytetrafluoroethylene, polyfluorotrichloroethylene, polycarbonates, polyesters, phenol-formaldehyde resins, polyvinyl butyral, cellulose acetate, cellulose acetate propionate, ethyl cellulose and polyoxymethylene resins.

Metal housings can be used. Suitable metals include stainless alloys, such as nickel, chromium, vanadium, molybdenum, and manganese alloys. The housing material should, of course, be inert to the fluids being processed.

The filter materials, of which one is liquid-repellent and one is wetted preferentially by the liquid, can have any desired pore size, according to the nature of the fluid being treated, and the nature of the contaminants, if any, to be removed. Since most filter materials are wetted by some liquids, and repel others, the materials chosen for each filter will depend upon the fluid being processed. If water is the liquid, then one of the filter materials is hydrophilic, and the other is hydrophobic.

In order to be effective in repelling and therefore not passing a gas, the liquid-wetted filter material should have a pore size of less than about 100 microns, and preferably less than 15 microns. In order to be effective in repelling and therefore not passing a liquid, the liquid-repellent filter material likewise should have a pore size of less than about 100 microns, and preferably less than about 15 microns. For bacteria removal purposes, as previously indicated, the pore size should be less than about 0.3 micron, and preferably less than 0.2 micron. A filter material that has too large a pore size can have the pore size reduced by impregnation, or coating, or both, with particulate and/ or fibrous material. Such materials and procedures are known.

Thus, there can be used as the filter material woven or nonwoven textile materials made of cotton, jute, sisal, hemp, flax, linen, wood fiber, metal wire, such as stainless steel, copper and aluminum, plastic filaments (monofilaments and yarn) such as nylon, polyvinyl chloride, polyacrylonitrile, esters of terephthalic acid and ethylene glycol, cuprammonium rayon, acetate rayon, viscose rayon and polyvinylidene chloride; sintered composites made from metal powder or particles, such as stainless steel, copper, bronze, or monel, or from plastic particles, such as polyvinyl chloride, nylon, polyethylene, polypropylene, polytetrafluoroethylene, and polyfluorotrichloroethylene; glass and ceramic materials; papers of various types, made up of cellulose fibers, cellulose cloth, plastic fibers, such as polyvinyl chloride, cellulose acetate, polyvinylidene chloride, nylon, and any of the other plastic filaments mentioned above, taken singly or in any combination; and microporous sheets, such as synthetic resin and cellulose derivative membrane filters.

Impregnated and/ or coated microporous filter sheet materials meeting these general requirements and that in particular can be made with less than 0.3 micron pores and thus are useful for the removal of harmful micro-organisms include the microporous materials of U.S. Pat. Nos. 3,158,532 to Pall et al. dated Nov. 24, 1964, 3,238,056 to Pall et al. dated Mar. 1, 1966, 3,246,767 to Pall et al. dated Apr. 19, 1966, and 3,353,682 to Pall et al. dated Nov. 21, 1967. Also useful for this purpose are microporous ceramic filters and the microporous membrane filters described in U.S. Pat. Nos. 1,421,341 to Zsigmondy, 1,693,890 and 1,720,670 to Duclaux, 2,783,894 to Dovell, 2,864,777 to Robinson, and 2,944,017 to Cotton.

Liquid repellency is obtained, if the filter is of a material that is wetted by the liquid, by treatment with a material that repels the liquid when disposed on the surfaces of the pore walls of the filter material. The repellent material can be applied from a solution of dispersion thereof, in a solvent or dispersant which desirably includes a binder, to retain the repellent on the pore wall surfaces, unless the repellent is reactive therewith, and can bond itself thereto.

The application can be by printing, spraying, coating, impregnating, dipping, or by exposure to a vapor, such as that of a low boiling silicone compound. It is necessary to use a technique that results in thorough treatment of the entire length of the pores, from surface to surface of the filter material. This requires impregnation of the wall surfaces of the pores from end to end, best achieved by allowing the solution or dispersion of the repellent to flow into and through the pores in the treated zone, by capillarity or by pressure application.

It will be appreciated that in nonwoven substrates, such as paper, nonwoven bats, and microporous layers formed by laydown from a fluid dispersion, the through pores that extend from one surface to another are composed of interconnected pores which are the interstices between the particulate material of which the material is made.

The amount of repellent that is required depends upon the effectiveness of the material as a repellent, and the volume of pores being treated. Usually less than 25 percent by weight of the volume being treated and preferably from 0.025 to 15 percent by weight of the volume is sufficient.

The repellent is chosen according to the liquid suspending medium being filtered. It must repel such liquid, or be rendered so in situ on the pore surface.

For a hydrophobic or water-repellent surface, there can be used silicone resins and silicone oils of the general type $R_n$-Si-O-SI-$R_n$, where $n$ is 1 or 2. $n$ is 1 in the case of the fluids, and $n$ is 2 in the case of the solids, which contain cross-links between chains. Mixtures containing species in which $n$ is from 1 to 3 can also be used. R is a hydrocarbon group having from one to 18 carbon atoms.

Also useful are the quaternary ammonium salt derivatives of silicone compounds described in U.S. Pat. No. 2,738,290, dated Mar. 13, 1956. These are substantive to cellulosic filter materials, as noted in the patent. Also, the hydrophobic oils and waxes can be used, in appropriate circumstances, where they can be made permanent.

If the filter material is liquid-repellent, and it is desired to make it liquid-wetting, it is advantageous to apply a liquid-wetting material thereto. The same treatment principles apply to liquid-wetted materials as to liquid-repellent materials. Typical wetting agents that are suitable are polyvinyl alcohol, alkyl aryl polyether alcohols, melamine formaldehyde resins, and the like. These wetting agents can be applied from a dispersion or emulsion.

When a gas entrained in a liquid is to be separated, one filter material that is liquid-repellent and therefore passes the gas being separated from the liquid preferably is placed on each side of a central liquid-wetted filter, so that at the least one of the liquid-repellent filters is at an upper portion or wall of the chamber in the housing in any position of the device. Inasmuch as gases normally rise, this means that gas can always reach one liquid-repellent filter.

While this type of device can be used to separate liquid entrained in a gas, liquid may not pass through the central liquid-wetted filter until a liquid pocket deep enough to cover over the liquid-repellent filter and reach the liquid-wetted filter is built up. This is not a disadvantage, if one of the liquid-repellent filters is still open to the passage of gas, and is not covered over or immersed in the liquid pocket, but such a device may be position-sensitive, and is therefore less preferred, for some uses.

On the other hand, if a liquid entrained in a gas is to be separated, one liquid-wetted filter preferably is placed on each side of a central liquid-repellent filter, so that one liquid-repellent filter is always at a lower portion of the housing. While this type of device can be used to separate gas from liquid, the gas may not pass through the central filter until an air pocket deep enough to reach the uppermost portion of the liquid-repellent filter has built up in the chamber. The building up of such a gas pocket is not a disadvantage, if one of the liquid-wetted filters is still fully open to the passage of fluid, and is not covered by or immersed in the air or other gas pocket, but such a device may be position-sensitive. It is therefore less preferred, for some uses.

For convenience of construction and minimum volume, in the liquid-gas separator and filter of the invention the liquid-repellent and liquid wetted filters are flat, in side-by-side alignment, and are as close together as in practical to define on one side of the fluid chamber a porous wall of a surface area adequate to pass the volumes of gas and liquid to be separated. The fluid chamber itself can be quite narrow. A suitable width for the fluid chamber is from 0.25 mm to about 5 mm, for medicinal uses, as an air separator and filter in a supply line to a patient. For other purposes, there is no limit except that dictated by the dimensions and flow requirements of the system in which it is to be placed.

The liquid-repellent and/ or liquid-wetted filters can also be arranged in a corrugated or undulating configuration, or in a raised, waffled or dimpled pattern, for a greater surface area in a small space. In this case, the surface of the filters is uneven, so that gas or liquid blockage due to gas or liquid pockets is unlikely, since the gas or liquid will not be in contact with all portions of the filter.

For simplicity of construction, the housing is best formed in two or three matching pieces, which when assembled define the fluid chamber therebetween, with the liquid-repellent and the liquid-wetted filters fixed in the same portion of the housing, alongside one another on one side of the chamber, and preferably in the same plane to each other in the final assembly. These parts can be separately molded, and then attached together, by bolts, or by heat-fusing or by solvent- or adhesive-bonding. In the case of plastic materials, heat-bonding is a preferred attachment technique, because it eliminates the presence of extraneous adhesives, does not affect transparency at the joints of a transparent housing, and is also leakproof.

The housing portions are constructed so that the three filters contained therein are spaced from the outer walls thereof, and separate the fluid chamber on one side from the first, second and third chambers, respectively. The housing portion containing the liquid-repellent and liquid-wetted filters has a gas outlet or vent communicating with the chamber on the outside of the liquid-repellent material, and a filtered liquid outlet or vent communicating with the chamber on the outside of the liquid-wetted material. The housing thus has at least four chambers, the fluid chamber to which the fluid containing both gas and liquid is delivered, for separation of the gas therefrom, and three outer chambers on opposite sides of the liquid-repellent and liquid-wetted materials, respectively, adapted to vent gas separated from the liquid, and to deliver filtered liquid from which gas has been separated.

The device shown in the drawings illustrates one preferred embodiment of the invention.

The liquid-gas separator and filter of FIGS. 1 to 6 comprises a rigid thin rectangular transparent polymethyl methacrylate box housing 1 formed in two parts: main housing portion 2 and a housing cover portion 3, integrated together at the seam 4, which is thereby obliterated internally, so that the two housing portions are held together as one piece.

Each housing portion is of a molded construction. Molded as an integral part on one side of the main housing portion 2 is a conduit 5 having at the end 6 a fluid-feed inlet port 7 and at the end 9 a fluid-feed outlet port 9 to which can be connected inlet and outlet lines 10, 11. The conduit at wall 12 is blocked off to through flow, and an opening 13 is provided leading into the fluid chamber 14 between housing portions 2 and 3, so that all fluid (liquid-containing gas, or gas-containing liquid) entering via the inlet line 10 passes into chamber 14.

Molded as an integral part of housing portion 2 are three chambers 15, 16 and 17, at whose open ends are molded inwardly-extending circumferential flanges 18, 19 and 20. Liquid-repellent filter sheets 22, 24 are bonded to the flanges 18, 20 of the chambers 15, 17, and liquid-wetted filter sheet 23 is bonded to the flange 19 of chamber 16. Four gas ports 25 are provided in chamber 15. Four gas ports 27 are provided in chamber 17. A passage connection 29 to the fluid conduit 6 and outlet line 11 is provided at one side of the chamber 16. The ports serve as gas vents, and the passage 29 to the fluid outlet line serves as a filtered lquid vent.

It will be evident that gas entering the fluid chamber 14 can leave the chamber through either of liquid-repellent filters 22, 24, while liquid entering the chamber 14 must leave through the liquid-wetted filter 23. Gas passing through the liquid-repellent filters 22, 24 enters chambers 15, 17 and can escape through any of the gas ports 25, 27, while liquid passing through the liquid-wetted filter 23 passes through the chamber 16 and passage 29 to the liquid outlet 11. Such liquid is filtered and entirely free from gas, and such gas is entirely free from liquid, by virtue of the separating effect of the liquid-repellent and liquid-wetted filter materials.

The liquid-repellent or hydrophobic filters 22, 24 were prepared as follows:

A microporous filter material in sheet form was prepared, following the procedure of Example I of U. S. Pat. No. 3,353,682. The average pore size was 0.1 micron and the maximum pore less than 0.35 micron as determined by 100 percent removal of the bacteria, Serratia marcescens.

An aqueous fiber dispersion was prepared containing 18 kg. glass fibers having an average diameter of 0.6 micron and 18 kg citric acid in 1,800 liters of water. This was agitated in a high shear Cowles mixer having a rotor diameter of seven inches at a speed of 1,800 rpm for 60 minutes. The resulting dispersion contained 10 g/l glass fibers.

To 1,500 liters of this dispersion was added 12,375 liters of water, 6.85 liters of 100 HS resin (55 percent solids, a copolymer of vinyl acetate and ethylene, in the form of an aqueous latex having very small, almost colloidal resin particles) dispersed in 1,100 liters of water, 7.5 liters of a 1 percent aqueous solution of aluminum sulphate, and 9.4 liters of 1 percent aqueous solution of NALCO 634 (a water-soluble aliphatic polyamine, molecular weight $10^4$ to $10^6$, specific gravity 1.175, 9.77 lbs. per gallon, pH 9.5, viscosity at 77°F., 70–250 cps), producing a dispersion having a glass fiber concentration of 1 g/l.

An aqueous potassium titanate glass fiber dispersion was prepared by adding 90 kg. of potassium titanate fibers to 900 liters of water, and beating the resulting mixture in a 300 Cowles dissolver at 1,100 RPM for 20 minutes. The dispersion had a fiber concentration of 100 g/l. The potassium titanate fibers were pigmentary potassium titanate, PKT, acicular in form, potassium tetratitanate. To 40 liters of this dispersion was added 780 liters of water, 8.9 liters of a 1 percent aqueous solution of NALCO 634, 32 liters of a 10 g/l glass fiber dispersion prepared as described above, except made with 0.08 micron average fiber diameter glass, 8 liters of water, and 20 liters of a 5 percent aqueous dispersion of 100 HS resin. The resulting dispersion had a fiber concentration of 4.5 g/l.

A paper sheet 0.002 inch thick, having an average pore diameter of 100 to 200 microns was placed on the foraminous belt of a Fourdrinier machine. The operation of the Fourdrinier machine was then begun, and the first dispersion fed to the paper over a vaccum box at a rate of 42 liters per minute, with the paper moving forward over the vacuum box at a rate of 8 feet per minute, producing a first layer on the paper of approximately 1.5 g/ft.$^2$.

The second dispersion was run onto the first layer coated on the paper at a rate of 56 liters per minute, with the paper moving forward at the same rate, 8 feet per minute, producing a second layer on the first having a weight of 9 g/sq. ft. of the pigmentary potassium titanate.

The coated paper was dried by passage under infrared heaters. A portion of the resulting microporous material was tested by passing air through it at 28 feet/minute; the pressure drop across the sheet was found to be 9.3 inches Hg. The specimen was again pressurized while covered by a 1 to 2 mm layer of alcohol, and the first bubble appeared at 26.0 inches Hg. The first layer had an average pore diameter of approximately 2 microns and maximum pore diameter of approximately 4 microns and a thickness of about 0.006 inch. The second layer had a maximum pore diameter of 0.2 micron as determined by bacteria removal tests, and a thickness of about 0.006 inch.

This material was then treated with General Electric's RTV-112 silicone resin, to render it water-repellent. The treatment was carried out by impregnation using a 5 percent solution of RTV-112 silicone resin solution in perchloroethylene, followed by evaporation of the solvent, and curing the resin at 40 percent relative humidity and at 25° C. for 18 hours. The deposition rate was approximately 0.1 cc of solution per square centimeter of filter material, extending to the opposite side of the material. The dry permeability of the material at 28 cu. ft. per minute of air per square foot was unchanged by the treatment.

The liquid-wetted or hydrophilic filter 23 was the same material, without the silicone resin treatment.

In use, fluid containing both gas and liquid enters via line 10 into the chamber 14 on one side of the filters 22, 23, 24. Fluid wets the liquid-wetted material 23, and as soon as the pores of this material are filled, gas can no longer pass through. On the other hand, liquid does not wet the liquid-repellent filters 22, 24 and gas is consequently free to pass through these filters, reaching the chambers 15, 17 on the other side thereof, and being vented to the atmosphere through vents 25, 26, 27, 28. Liquid passing through the liquid-wetted material 23 enters the chamber 16, whence it is delivered from the device through the passage 29 and outlet 11.

The fluid inlet port 7 and filtered liquid outlet port 9 are shaped to match any type of fluid line in the system in which the separator is to be used. The outlet port 9 can, for example, be adapted for connection directly to a Luer needle, or to a tubing leading to a Luer needle, as desired, and the fluid inlet port 7 can then be connected to a liquid supply container of the type used in medicinal applications.

This device can easily be strapped or otherwise attached to the limb of a patient for use in administration of any fluid medicament.

The liquid-gas separator and filter shown in the drawings as described above is useful to filter liquids and separate gases from liquids or liquids from gases in any type of medicinal and chemical application. They can, for instance, be used both to clear a line of air and to prevent the introduction of air into a patient receiving an injection of any type of fluid medicament, such as parenteral fluid, blood transfusions, blood plasma, intravenous feeding solutions, and the like. Such fluids can be delivered to a patient under gravity pressure, or under higher pressures, such as are encountered when the fluid delivery is effected by means of a syringe pump, and will prevent the introduction of air into the patient, at all pressures below the bubble point of the liquid-wetted filter material that is used, both at the beginning of the introduction of the liquid, even when the line before the separator contains air, and after delivery of fluid has exhausted the supply.

The devices are also useful in the gravity-free filtration of liquids and separation of gases and liquids, such as in outer space, beyond the influence of earth gravity, and they can be used to filter liquids and remove gases from the liquids entraining them, in any type of chemical process such as in the separation of hydrogen and other reactive gases from liquids, in hydrogenation and other gas-reactant reactions. Because they require no electric power or other source of power, they are move versatile than centrifugal separators, and because of their small, compact size, they are usually better suited for the purpose.

The liquid-gas separators and filters of the invention are also helpful in the separation of liquids entrained in gases, provided the liquid-wetted filter material is fully wetted with the liquid being separated before operation is begun, so as to ensure that gas is not emitted through the liquid-wetted line. However, if the presence of gas in this line is no problem, then, of course, this expedient can be dispersed with. In such uses, the liquid-repellent filter material will ensure that the liquid is removed from the gas, and that liquid-free gas is obtained. Such devices are useful in air purifiers, and also in chemical plants where the entrainment of liquids in the stack gases must be prevented, so as to avoid pollution of the atmosphere and damage to the surrounding countryside. In these uses, the devices of the invention are better suited than electrostatic precipitators, since they require no external power.

I claim:

1. A liquid-gas separator and filter that is capable of separating gases and liquids and of venting the gases in any position of the separator, comprising, in combination, a housing composed of at least two housing portions attached together; one housing portion having interior walls defining first, second and third chambers arranged side-by-side; two housing portions defining between them a gas-liquid fluid chamber in separate fluid-flow connection with each of the first, second and third chambers; first, second and third filter sheets across the line of fluid flow between the fluid chamber and the first, second and third chambers, of which filter sheets at least one is of filter material that is wetted by a liquid to be passed through the housing, and at least one is of filter material that is not wetted by such liquid, and the other is of either filter material, the liquid-wetted and liquid-nonwetted filter sheets being arranged in alternating sequence and such that all flow between the fluid chamber and the three chambers must pass through a filter, the liquid-wetted filter passing only gas when wetted with liquid, and the liquid nonwetted filter passing only gas; an inlet in the housing for delivering fluid comprising gas and liquid to the fluid chamber; a filtered liquid outlet in the housing on the opposite side of each liquid-wetted filter; a gas outlet in the housing in the opposite side of each liquid-nonwetted filter, the chamber on the opposite side of each liquid-wetted filter communicating with a liquid outlet, and the chamber on the opposite side of each liquid nonwetted filter communicating with a gas outlet.

2. A liquid-gas separator and filter according to claim 1, wherein the liquid-wetted and the liquid-nonwetted materials have an average pore size less than 0.3 micron.

3. A liquid-gas separator and filter according to claim 1, wherein the housing and associated parts of the separator are made of plastic.

4. A liquid-gas separator and filter according to claim 1, wherein the parts are bonded or fused together in a one-piece construction.

5. A liquid-gas separator and filter according to claim 4, in which the parts are plastic parts.

6. A gas separator and filter according to claim 1, in which the three filters are arranged side-by-side in the same plane.

7. A liquid-gas separator and filter according to claim 1, in which said one housing portion has two fluid conduits on one side, one communicating at one end with a liquid outlet and at the other end with the chamber or chambers on the opposite side of each liquid-wetted filter, and one communicating at one end with the liquid-gas fluid inlet, and at the other end with the fluid chamber.

8. A liquid-gas separator and filter according to claim 1, wherein at least one of the filter materials is a microporous membrane filter.

9. A liquid-gas separator and filter as claimed in claim 1, wherein at least one of the filter materials comprises a porous substrate coated with a microporous fibrous layer.

10. A liquid-gas separator and filter as claimed in claim 1, wherein at least one of the filter materials comprises a porous substrate impregnated with a microporous layer.

11. A liquid-gas separator and filter according to claim 1, wherein at least one of the filter materials is supported on a foraminous sheet support.

12. A liquid-gas separator and filter according to claim 1, wherein the total volume of the four chambers is less than 1 cc.

13. A liquid-gas separator and filter according to claim 1, wherein the housing portions are of rigid material.

14. A liquid-gas separator and filter according to claim 1, wherein the housing is of transparent material.

15. A liquid-gas separator and filter according to claim 1, wherein the filter materials are each microporous.

* * * * *

UNITED STATES PATENT OFFICE
CERTIFICATE OF CORRECTION

Patent No. 3,803,810      Dated April 16, 1974

Inventor(s) David Rosenberg

It is certified that error appears in the above-identified patent and that said Letters Patent are hereby corrected as shown below:

| | |
|---|---|
| Column 3, line 12 | : after "through" insert --and-- |
| Column 3, line 61 | : "captable should be -- capable -- |
| Column 4, line 32 | : "fliquid" should be -- liquid -- |
| Column 4, line 33 | : "gas" should be -- liquid -- |
| Column 6, line 58 | : "of" should be -- or -- |
| Column 10, line 20 | : "vaccum" should be -- vacuum -- |
| Column 12, line 16 | : "gas" should be -- liquid -- |

Signed and Sealed this thirteenth Day of April 1976

[SEAL]

Attest:

RUTH C. MASON
Attesting Officer

C. MARSHALL DANN
Commissioner of Patents and Trademarks